United States Patent Office 3,526,128
Patented Sept. 1, 1970

3,526,128
DEVICE FOR MEASURING ABSOLUTE VIBRATIONS IN THE ROTOR-STATOR SYSTEM
Afanasy Mikhailovich Kornienko, Prospekt Pravdy 7, kv. 104; Anatoly Petrovich Borisenko, Poselak Pesochin, ul. Shkolnaya 23; Vasily Alexeevich Sotnikov, Ul. Gogolya 1, kv. 20; and Irina Nikolaevna Derbunovich, Ul. Novoproektnaya 6, kv. 3, all of Kharkov, U.S.S.R.
Filed Mar. 1, 1967, Ser. No. 619,724
Int. Cl. G01h 11/00
U.S. Cl. 73—71.2                               4 Claims

ABSTRACT OF THE DISCLOSURE

A device for measuring absolute vibrations in a rotor-stator system comprising a sealed casing fastened to the stator and having therein an inertial mass mounted by elastic suspension means for free travel in the casing and is held stationary within the inertial co-ordinate system having a fluid surrounding the mass to provide a distributed damping of the mass and its suspension. A contactless transducer for converting vibrations into electric signals, said transducer being rigidly connected to the inertial mass and being magnetically inductively responsive to relative movements of said rotor, the casing being non-magnetic and free from inductive interference with said transducer.

---

Figure 1:
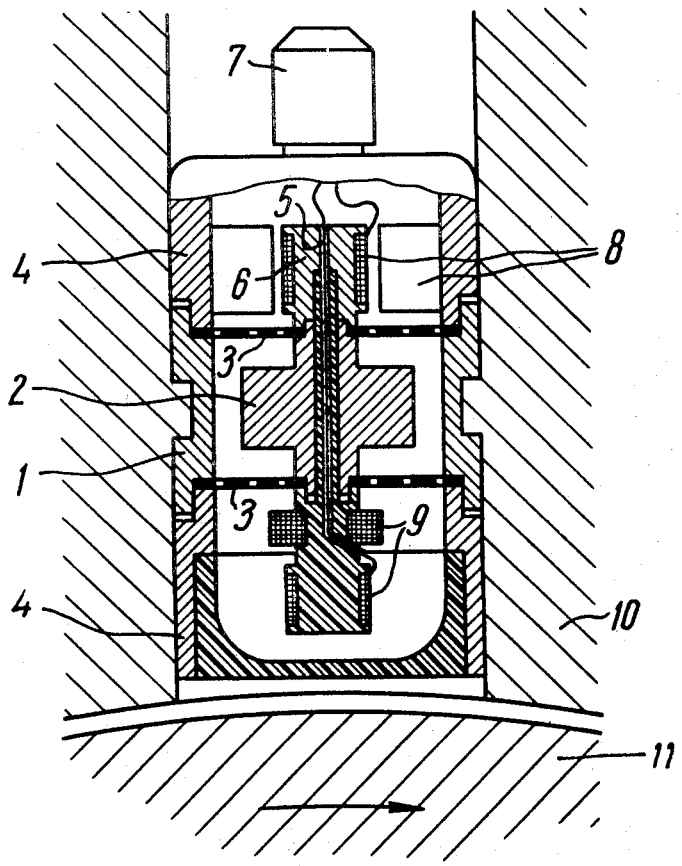

The present invention relates to transducers capable of converting non-electric magnitudes into an electric signal at the output, and, more particularly, to seismic transducers of mechanical vibrations into an A.C. output signal, whose frequency and amplitude vary in conformity with changes in characteristics of the mechanical vibrations measured.

The present invention is to be employed mainly in vibration measuring devices of various machines and mechanisms comprising a rotor-stator system (a steam turbine, turbogenerator, electric motor, diesel, lathe, etc.) i.e. in all cases when the parameter measured is expressed as oscillatory motion.

Known in the art are seismic-type devices whose output signal depends upon the amplitude and frequency of the mechanical vibrations to be measured, said vibrations being directly applied to the transducer body and thereafter converted into an electric signal.

However, these devices must be in direct contact with the controlled object, which fact makes them ineffective for measuring absolute vibrations of rotors rotating with high peripheral velocity.

Use has been made of devices for contactless measurement of absolute vibrations of a rotating shaft, said devices comprising a permanent magnet suspended from an elastic element, said magnet continuously following the vibrations of the rotating part.

To eliminate vibrations of the fixing place of the transducer body use is made of an auxiliary oscillating system, identical to the main oscillatory system, the permanent magnet of said auxiliary oscillating system being arranged at a certain distance from the ferromagnetic portion of the transducer body, said distance not depending on the position of the rotor center.

A serious disadvantage of these devices is the non-linear dependence of the forces of rotor and permanent magnet interaction on the gap therebetween, which, in turn, leads to a non-linear relationship between the transducer response and the magnitude of the rotor vibration.

In the course of operation of the rotor-stator system the position of the rotor centre does not remain constant relative to the bearing casing, therefore the gap between the rotor and permanent magnet of the main oscillating system will differ from that of the initial gap, whereas the gap between the permanent magnet of the auxiliary oscillating system and the feromagnetic portion of the body remains constant, therefore the conditions for the compensation will be upset.

A considerable disadvantage of the conventional device lies also in the fact that forces of mechanical interaction of the rotor with the permanent magnet depend on the magnetic field existing in the rotating rotor.

Another disadvantage of the conventional device is due to the presence of two identical oscillating systems with equal degree of damping.

These disadvantages preclude the use of said devices under conditions of, e.g. operation of the rotor in anti-friction bearings, since the relatively slow displacement of the rotor centre substantially exceeds the vibratory displacement of the rotor.

Apart from this, the sensitivity of the rotating part to the magnetic fields is an obstacle which precludes the use of said devices in the rotor-stator systems.

It is, therefore, an object of this invention to provide devices possessing one seismic system and enabling the absolute rotor vibration to be measured by a contactless method.

It is another object of the present invention to provide devices which make it possible to simultaneously measure absolute vibrations of the rotor and stator with a higher degree of accuracy.

It is still another object of the present invention to provide a device capable of functioning normally in conditions of magnetic fields appearing in the rotating rotor.

It is a further object of the present invention to provide a device whose inertial mass would be practically stationary in the inertial coordinate system and non-sensitive to non-measured vibrations of the body of the device in the operating range of frequencies and amplitudes.

It is a still further object of the present invention to provide a device featuring constant response to the measured vibrations irrespective of the position of the centre of the rotating part.

With these and other objects in view, a device has been developed with a single seismic system whose body is rigidly connected with the stator of the system to be investigated, and the inertial element of the seismic system, which is practically immovable in the inertial coordinate system at periodic vibrations of the body of the seismic system serves as a zero (reference) point for concurrent measuring of absolute vibration displacements of the rotor and stator. To this end, in the device of the present invention a seismic system is employed which operates in a fluid that fills the body of the vibration transducer thereof and ensures a distributed damping of the entire seismic system, use being also made of two independent transducers rigidly associated with the inertial element of the seismic system, one of said independent transducers being responsive in a contactless manner to the variation of the gap between the surface of the rotor and the inertial element, and the other being responsive in a contactless manner to relative displacements of the inertial element and the body of the vibration transducer that is rigidly connected with the stator.

For attaining distributed damping so as to ensure the provision of practically stationary state of the inertial element, the hermetically sealed body of the vibration transducer is filled with a fluid (such as toluene, a mixture of toluene and motor oil and the like), and resilient suspension members and the inertial element are made to have surfaces perpendicular to the axis of travel of the inertial element, that is, they are made so as to constitute a sort of piston free to travel in a cylinder. The said surfaces offer frontal resistance to the overflow of the fluid and cause the following phenomena:

(a) Essentially limit the amplitude of the intrinsic resonance of the seismic system and eliminate resonances of the resilient suspension members;

(b) Create a force opposite to that of the resilient suspension members effective in the postresonance period, whereby the movement of the inertial element is reduced starting already at a frequency whose value is 1.5–2 times that of the intrinsic resonance frequency;

(c) Call forth "a connected mass" of fluid that reduces the resonance frequency with the initial rigidity of the resilient suspension members being preserved.

One of the embodiments of the device according to the present invention envisages the employment of a high-frequency inductive transducer as a contactless transducer, said high-frequency inductive transducer featuring a series resonance circuit connected with an oscillator output, with the coupling factor exceeding the critical value at which the working range of the transducer lies on the internal slope of the double-humped characteristic resonance curve of the transducer, whereby a linear dependence is attained between the voltage at the transducer output and the gap between the vibration transducer and the rotor, the sensitivity of the transducer being better to a considerable extent than in the case of the coupling factor below the critical value, said sensitivity being obtainable at a distance determined by the thickness of the "transparent" cover of the hermetically sealed body of the vibration transducer and the gaps between the transducer (the inductance coil of the series resonance circuit) and the cover, on the one hand, and between the rotor and the cover, on the other hand.

For measuring vibrations of the stator, according to the invention, use is made of a transducer that is mounted inside a body and is responsive to the vibrations of the body relative to the inertial mass.

Figure 2:
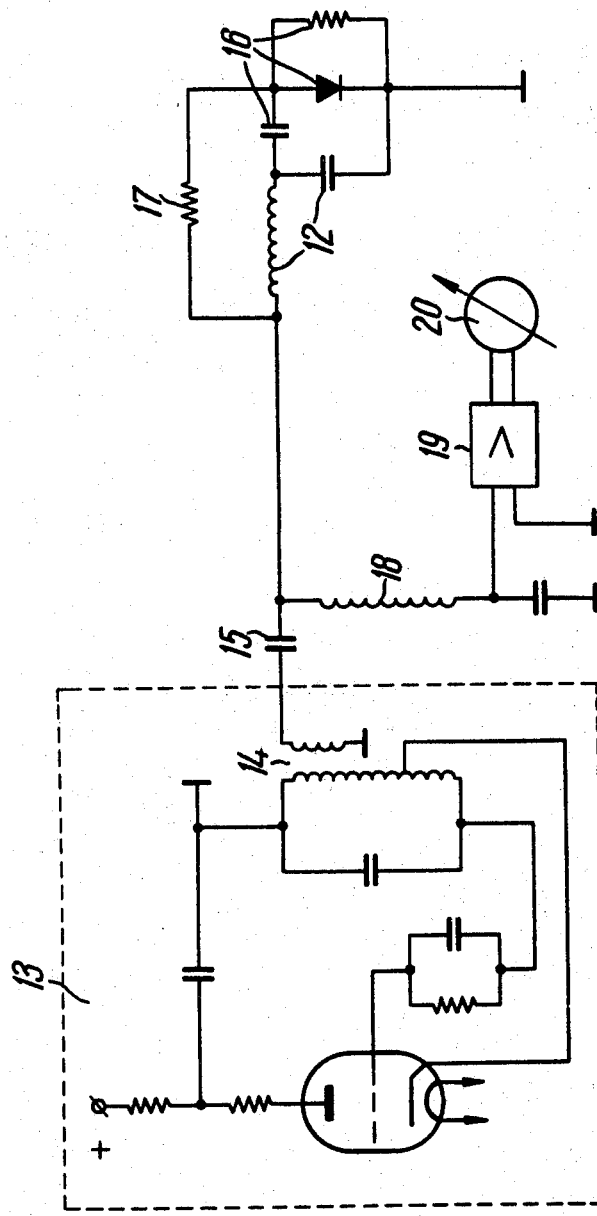

An embodiment of the present invention will be described hereinbelow by way of illustration with reference to the accompanying drawings, in which:

FIG. 1 is a general view of the device for measuring absolute vibration displacements of the elements of the rotor-stator system according to the invention; and FIG. 2 is an electric circuit diagram of the high-frequency inductive transducer according to the invention.

The device comprises a body 1, an inertial mass 2, two springs 3 clamped between the body 1 and covers 4, a rod 5 and a nut 6 serving to fasten the inertial mass 2 to said two springs 3, a current-collecting means 7, a transducer 8 adapted to respond to and convert the vibration displacements of a stator 10, and a transducer 9 adapted to respond to and convert the vibration displacements of a rotor 11. The bottom of the cover 4 that closes the vibration transducer from the side of the rotor is "transparent" for the transducer 9.

The inertial mass 2 together with the springs 3 constitute what may be called a piston of a damping unit, whereas the body 1 in combination with the covers 4 make up a cylinder of said damping unit.

The transducer 9 per se is essentially a series circuit shown at 12 in FIG. 2 and connected with an oscillator 13 via an inductive coupling 14 and capacitor 15. An amplitude detector 16 is adapted to separate a low-frequency signal proportional to the vibration displacements of the rotor from a high-frequency voltage modulated by the vibration displacements of the rotor. A resistor 17 limits the leakage of the high-frequency voltage. A choke 18 limits the delivery of the high-frequency voltage to the input of an amplifier 19. Vibration displacements of the rotor are registered by an indicator instrument 20 coupled to the output of the amplifier 19.

The oscillator 13 and the amplitude detector 16 may be arranged either inside or outside the body of the device.

The transducer 8 (FIG. 1) may be made similar to the transducer 9 and have a similar electric circuit diagrammatically represented in FIG. 2, so as to be responsive to the variation of the gap between it (rigidly connected with the inertial element) and the body of the vibration transducer. Thus, said transducer will produce a signal that characterizes the vibration of the body of the vibration transducer rigidly connected with the stator.

In contradistinction to the operation of the transducer 9, the initial gap between the transducer 8 and the body of the vibration transducer is constant, with the value of the dielectric coefficient of the medium within said gap also being constant, so that said initial gap may be selected to be of a small value, whereby one of conventional transducers such as a capacity transducer, an inductive transducer, a high-frequency inductive transducer with a coupling factor less than the critical value, may be employed as the transducer 9.

Vibrations of the rotor 11 are measured with the help of the direct transducer 9 relative to the inertial mass (or element) 2, the said transducer being rigidly connected therewith.

In the course of operation of the system being investigated, the stator 10, and the body 1 of the device together therewith, perform oscillatory motions; however, due to the seismic system that operates in a fluid (e.g. in toluene) and features distributed damping, the said motion practically does not affect the inertial mass 2. This is attained due to the fact that both the inertial element and the resilient suspension members are made with surfaces offering frontal resistance to the overflow of the fluid, said frontal resistance considerably exceeding the viscous resistance of the fluid and thus providing for the creation of a force that compensates for the excess action of the resilient suspension members in the postresonance frequency range.

The choice of the value of the frontal resistance area and of the fluid to be employed is determined by the specific conditions to be met by the design of the vibration transducer, particularly by the width of the working frequency range, permissible ratio between the motion of the body of the vibration transducer and the motion of the inertial element, by the electric properties of the fluid, permissible dimensions of the inertial element, etc. It should be noted that in the present seismic system which features distributed damping, wide-range variations of the fluid viscosity do not cause essential changes in the movement of the inertial element, since the forces of frontal resistance prevail over those of viscous friction.

The provision of distributed damping, according to the invention, is also instrumental in eliminating the effect of secondary resonances of the resilient suspension members caused by perpendicular oscillations of the body 1, and, also, calls forth a "connected mass" of the damping fluid, thus reducing the frequency of the intrinsic resonance of the seismic system and thereby widening the region of immobility of the inertial element 2 within the inertial coordinate system.

From the high-frequency signal of the resonance circuit 12, modulated by the vibrations of the rotor 11, by means of the amplitude detector 16 (FIG. 2) a signal is separated, proportional to the magnitude and frequency of vibrations of the rotor 11, and the resistor 17 and high-frequency choke 18 this signal is fed to the input of the amplifier 19 with the measuring instrument 20 coupled to the amplifier output.

The capacitor of the amplitude detector 16 not only performs its direct functions, but also serves as a suppression filter that does not allow the signals of the magnetic field of the rotor 11 to pass to the transducer output.

The vibrations of the body 1 of the device and, hence, of the stator 10 are measured by means of the transducer 8 which is rigidly connected to the inertial element 2 and responds to the relative displacements of the inertial element and the body of the vibration transducer.

While the present invention has been described hereinabove with reference to a preferred embodiment thereof, it is to be understood that alterations and modifications

What is claimed is:

1. A device for sensing absolute vibrations in a rotor-stator system comprising: a sealed hollow body fastened to the stator adjacent to the rotor; an inertial mass within the body; an elastic suspension means for said inertial mass suspending said mass for displacement relative to the body radially of the rotor so that the mass is held stationary within an inertial coordinate system; a fluid within said body damping motion of said inertial mass; a contactless transducer means mounted on said inertial mass adjacent to the end of said body near the rotor for producing an electrical output signal which is a function of the spacing between the transducer means and rotor; the portion of the sealed body between the transducer means and rotor being transparent to the property of the rotor which is utilized by the transducer means.

2. A device as claimed in claim 1, wherein said contactless transducer means is essentially a high frequency inductive transducer, possessing a resonance oscillatory circuit coupled to an oscillator with a coupling coefficient above the critical value at which the operating frequency range is on the inner slope of the resonance circuit characteristic curve, which fact makes it possible to obtain a linear relationship between the transducer output voltage and the gap between the transducer and the rotor.

3. A device as claimed in claim 1, wherein damping is effected by making the inertial element and elastic suspension means with surfaces that are perpendicular to the longitudinal axis of the body and constitute a sort of freely moving piston, said surfaces offering frontal resistance to the overflow of fluid that fills the body and functions as a dampening fluid, said body of the vibration transducer constituting a cylinder of the damping system.

4. A device for sensing absolute vibrations in the rotor-stator system comprising: a hollow body fastened to the stator adjacent to the rotor; an inertial mass installed within said body, flat springs normal to the longitudinal axis of said body for elastic suspension of said inertial mass inside the body; a contactless high frequency inductive vibration transducer means rigidly fixed to said inertial mass near the rotor for producing an electric output signal proportional to the spacing between the transducer means and the rotor and thereby indicative of the rotor vibrations; a second transducer inside said body with a part thereof secured to said inertial mass for sensing vibrations of the body with respect to said inertial mass.

References Cited

UNITED STATES PATENTS

| | | | |
|---|---|---|---|
| 2,985,823 | 5/1961 | Wright | 324—34 |
| 2,272,984 | 2/1942 | Ritzmann | 73—71.2 XR |
| 2,985,010 | 5/1961 | Piltz | 73—71.4 |
| 3,164,995 | 1/1965 | Federn et al. | 73—71.2 XR |
| 3,308,647 | 3/1967 | Crawford | 73—71.2 XR |
| 3,353,098 | 11/1967 | Foster et al. | |

JAMES J. GILL, Primary Examiner